United States Patent
Buono et al.

(10) Patent No.: US 7,458,603 B2
(45) Date of Patent: Dec. 2, 2008

(54) VEHICLE SEAT COMPONENT HAVING AIR BAG GUIDE AND TRIM COVER WITH RELEASE SEAM

(75) Inventors: Robert A. Buono, Manchester, MI (US); Jerry A. Maroudis, Shelby Township, MI (US); Michael P. Modreski, Wixom, MI (US)

(73) Assignee: Lear Corporation, Southfield, MI (US)

( * ) Notice: Subject to any disclaimer, the term of this patent is extended or adjusted under 35 U.S.C. 154(b) by 453 days.

(21) Appl. No.: 11/275,499

(22) Filed: Jan. 10, 2006

(65) Prior Publication Data
US 2007/0158930 A1 Jul. 12, 2007

(51) Int. Cl.
*B60R 21/207* (2006.01)

(52) U.S. Cl. .................. 280/728.2; 280/730.2

(58) Field of Classification Search .............. 280/728.2, 280/730.2
See application file for complete search history.

(56) References Cited

U.S. PATENT DOCUMENTS

| | | | |
|---|---|---|---|
| 5,678,853 A * | 10/1997 | Maly | 280/730.2 |
| 5,810,389 A | 9/1998 | Yamaji et al. | |
| 5,860,673 A | 1/1999 | Hasegawa et al. | |
| 5,967,546 A | 10/1999 | Homier et al. | |
| 6,045,151 A | 4/2000 | Wu | |
| 6,237,934 B1 | 5/2001 | Harrell et al. | |
| 2005/0156412 A1 | 7/2005 | Panagos et al. | |
| 2006/0131848 A1 * | 6/2006 | Miyake et al. | 280/730.2 |

FOREIGN PATENT DOCUMENTS

| | | |
|---|---|---|
| DE | 697 19 171 T2 | 7/2002 |
| DE | 698 08 194 T2 | 3/2003 |
| DE | 10 2005 002 200 A1 | 8/2005 |
| DE | 10 2005 057 443 A1 | 6/2006 |
| EP | 1400415 A2 | 3/2004 |
| EP | 1400415 A3 | 3/2004 |
| GB | 2 410 011 A | 7/2005 |
| WO | 00/06426 A1 | 2/2000 |
| WO | 2006/029729 A1 | 3/2006 |

* cited by examiner

*Primary Examiner*—Eric Culbreth
*Assistant Examiner*—Karen J. Amores
(74) *Attorney, Agent, or Firm*—Brooks Kushman P.C.

(57) ABSTRACT

An air bag guide (44) for a vehicle seat component (14) includes flexible inner and outer panels (46, 48) having outer extremities (50, 54) located adjacent a release seam (32) of a trim cover (30), with the outer extremity (50) of the flexible inner panel secured to the trim cover, and with the outer extremity (54) of the flexible outer panel (48) unconnected to the trim cover and curved to provide a guide flap (62).

10 Claims, 4 Drawing Sheets

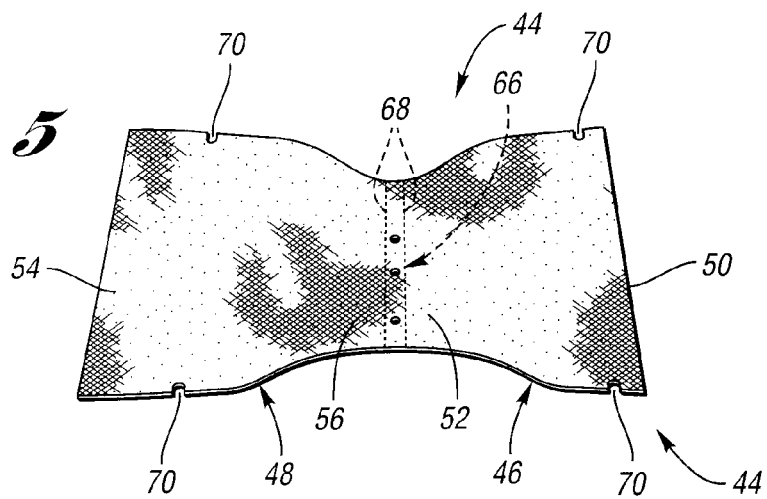
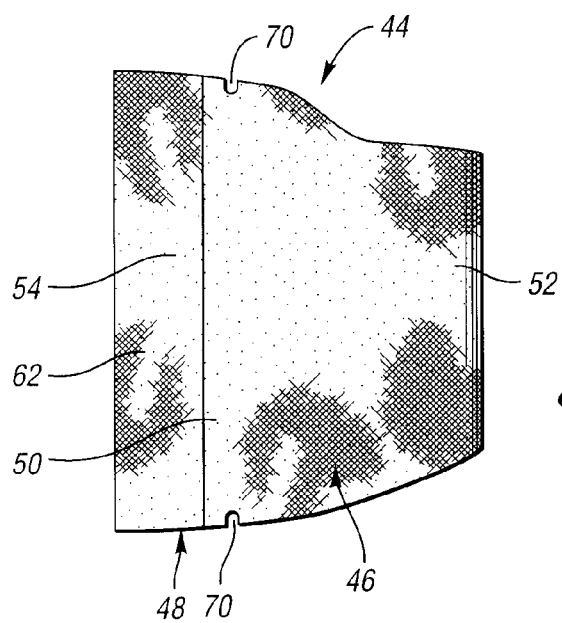
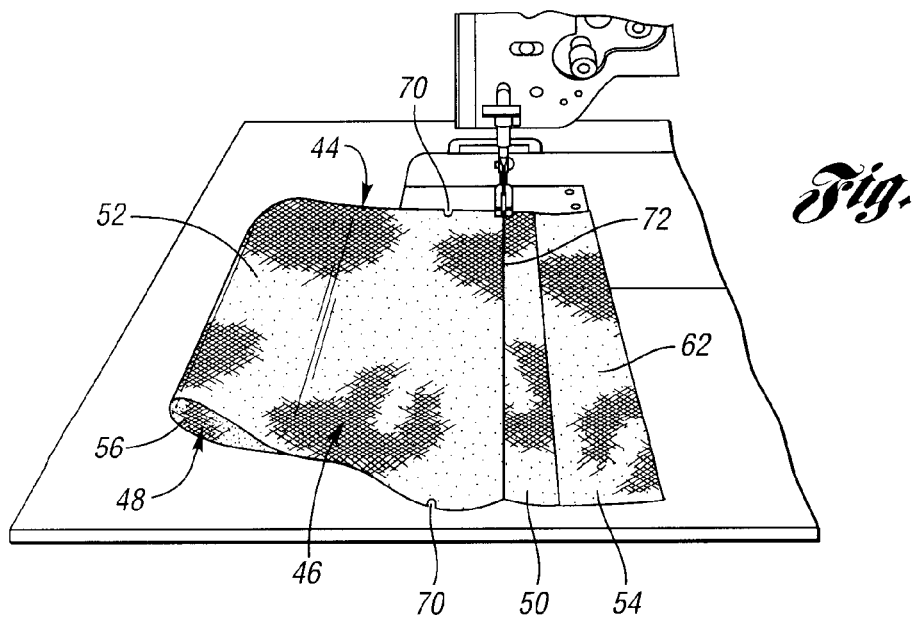

VEHICLE SEAT COMPONENT HAVING AIR BAG GUIDE AND TRIM COVER WITH RELEASE SEAM

BACKGROUND OF THE INVENTION

1. Field of the Invention

This invention relates to a vehicle seat component having a trim cover with a release seam and also having an air bag guide with a flexible panel.

2. Background Art

Vehicle seat components have previously included side air bag modules and conventionally include trim covers that have an air bag release seam through which an air bag upon deployment is projected outwardly from within the seat to provide occupant protection. See, for example, U.S. Pat. No. 5,816,610 Higashiura et al.; U.S. Pat. No. 5,860,673 Hasegawa et al.; and U.S. Pat. No. 5,938,232 Kalandek et al. Different constructions have been utilized to permit passage of the air bag past foam seat padding when inflated by an inflator for movement from within the seat component outwardly through the trim cover release seam. For example, U.S. Pat. No. 6,045,151 Wu discloses a seat pad having a slot through which the air bag moves from an air bag module to the release seam and also discloses a cloth sleeve that extends entirely about the associated air bag module and to the release seam. Also, U.S. Pat. No. 6,237,934 Harrell et al. and U.S. Pat. No. 6,588,838 Dick, Jr. et al., both of which are assigned to the assignee of the present invention, disclose air bag modules wherein the air bag module is located closely adjacent to the release seam to facilitate the air bag deployment.

Other prior art noted by an investigation conducted in connection with the present application include: United States patents: U.S. Pat. No. 5,810,389 Yamaji et al.; U.S. Pat. No. 5,860,673 Hasegawa et al.; U.S. Pat. No. 5,967,546 Homier et al.; United States Patent Application Publication 2005/0156412; PCT International Publication WO 00/06426; and European Patent EP 1400415 A3.

A vehicle seat component constructed in accordance with the invention includes a frame for mounting on an associated vehicle on which the vehicle seat component is to be used. A seat pad is mounted by the frame and has an inner surface that faces the seat pad and an outer surface that faces outwardly. An air bag module is mounted on the frame within the trim cover in a spaced relationship from its air bag release seam. The air bag module includes an inflator and an air bag that is inflated by the inflator for movement to the trim cover release seam which is then torn open so the air bag can project outwardly therethrough from the seat component. An air bag guide of the seat component includes an inner panel and an outer panel that are each made of flexible material and have outer and inner extremities with their outer extremities located adjacent the air bag release seam. The flexible inner and outer panels extend alongside each other from their outer extremities to the air bag module and thence respectively inwardly and outwardly of the air bag module. The outer extremity of the flexible inner panel is secured to the trim cover adjacent the release seam. The outer extremity of the flexible outer panel is free from attachment to the trim cover and has a curved shape extending around the seat pad adjacent the release seam and thence away from the release seam alongside the trim cover to provide a guide flap. A connection secures the inner extremities of the flexible inner and outer panels to the frame.

The inner extremities of the flexible inner and outer panels are located between the air bag module and the frame, and at least one connector embodies the connection for securing the air bag module and the inner extremities of the flexible inner and outer panels to the frame. The inner extremities of the flexible inner and outer panels are secured to each other and located between the air bag module and the frame. The securement of the inner extremities of the flexible inner and outer panels is provided by stitching, which includes two stitched rows as disclosed.

The flexible inner and outer panels include indicators for positioning thereof juxtaposed with respect to each other during fabrication so the outer extremity of the flexible outer panel extends past the outer extremity of the flexible inner panel to provide the guide flap. The flexible inner and outer panels are secured to each other adjacent the release seam of the trim cover. This securement of the flexible inner and outer panels to each other adjacent the release seam of the trim cover is provided by stitching, and stitching also secures the outer extremity of the flexible inner panel to the trim cover adjacent the release seam as well as securing the release seam of the trim cover.

The objects, features and advantages of the present invention are readily apparent from the following detailed description of the preferred embodiment when taken in connection with the accompanying drawings.

BRIEF DESCRIPTION OF THE DRAWINGS

FIG. 5 is a perspective view illustrating the flexible inner and outer panels of the air bag guide laid generally flat in preparation for fabrication.

FIG. 6 is a view of the air bag guide after the inner panel has been folded over onto the outer panel while leaving the outer panel extending past the inner panel to provide a guide flap.

FIG. 7 is a view showing the inner and outer panels being stitched to each other a location which after assembly is adjacent the trim cover release seam shown in FIGS. 3 and 4.

DETAILED DESCRIPTION OF THE PREFERRED EMBODIMENT

Figure 1:
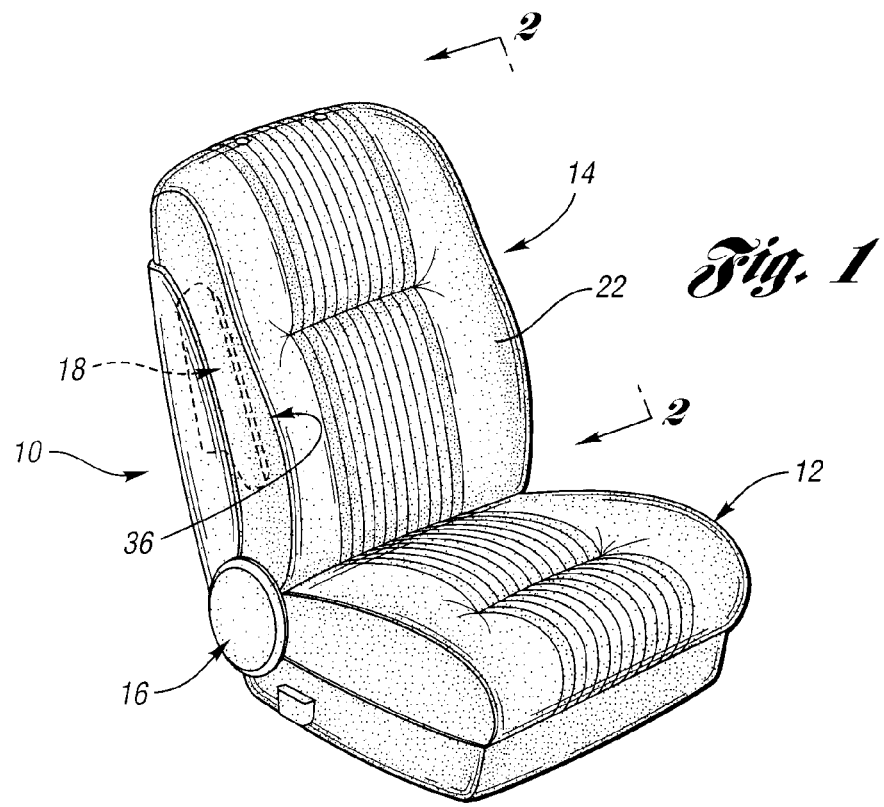
FIG. 1 is a perspective view of a vehicle seat including a seat back component constructed in accordance with the invention to include a side air bag module that is shown by hidden line illustration.
Figure 2:
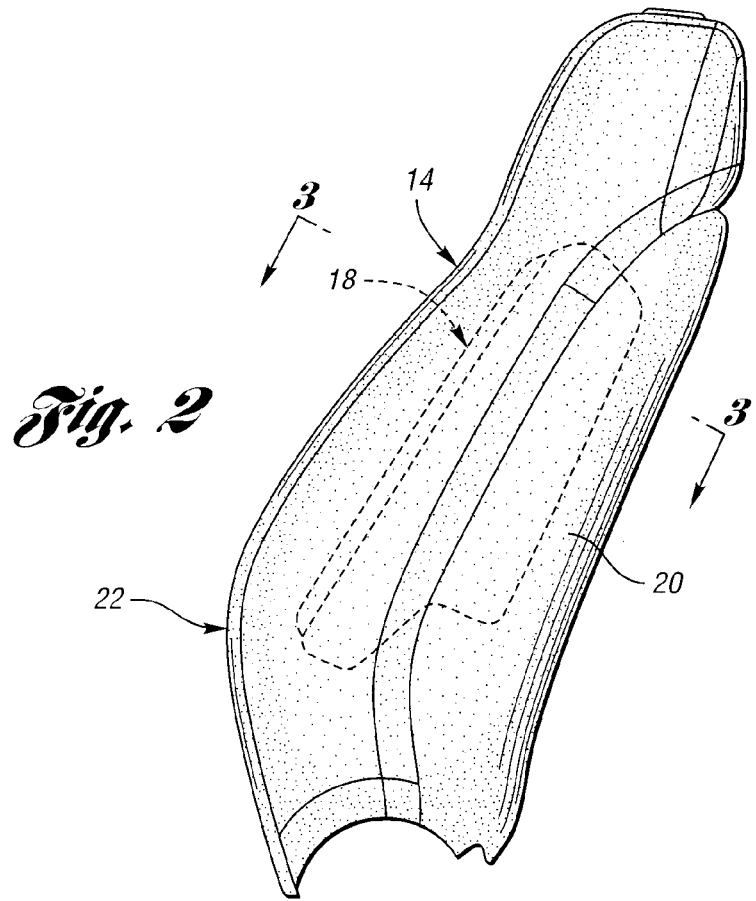
FIG. 2 is a side elevational view of the vehicle seat back component taken along the direction of line 2-2 in FIG. 1 with the side air bag module thereof also illustrated by hidden line representation.

With reference to FIG. 1 of the drawings, a vehicle seat generally indicated by 10 includes a seat bottom 12 for mounting on a vehicle floor and a seat back 14 mounted in a generally upstanding manner on the seat bottom with its angular position controlled in a conventional manner by a recliner generally indicated by 16. The seat back component 14 includes a side air bag module 18 that is constructed in accordance with the present invention as it is hereinafter more fully described and operable to provide seat occupant protection. While the side air bag module 18 is shown on the seat back 14, which is a usage for which it has particular utility, it is also possible for the side air bag module to be utilized with a seat bottom 12 even though the seat back usage is specifically disclosed. Also, as illustrated, the side air bag module 18 is located at an outboard lateral side or extremity of the seat to provide protection against adjacent vehicle structure, but it is also possible to have the side air bag module located at the inboard lateral side to provide protection against an adjacent vehicle occupant and to also have side air bag modules at both outboard and inboard locations for protection in both lateral directions. As shown in FIG. 2, the seat back 14 includes a back panel 20 that is conventionally molded from plastic and also includes a front cushion 22 against which the seat occupant leans to provide back support and in which the side air bag module 18 is located.

Figure 3:
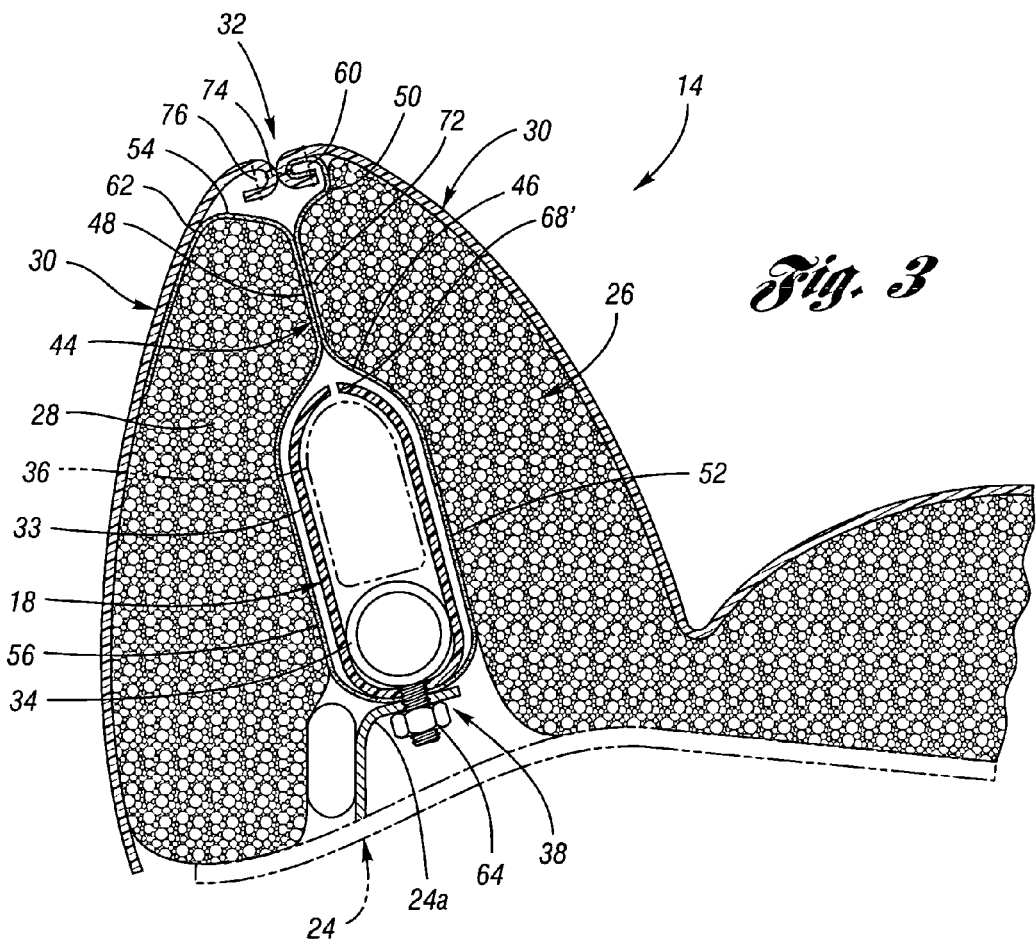
FIG. 3 is a sectional view taken through the seat back component along the direction of line 3-3 in FIG. 2 to further illustrate the construction of the side air bag module within the seat back component.

As shown in FIG. 3, the seat back component 14 includes a frame collectively identified by 24. A foam seat pad 26 is mounted on the frame 24 in any conventional manner and has opposite side extremities 28 (only one shown) spaced laterally from each other at the opposite lateral sides of the seat. A trim cover generally indicated by 30 extends over the seat pad 26 and, as is hereinafter more fully described, includes an air bag release seam 32 adjacent the shown seat pad side extremity 28 which corresponds to an outboard location. The side air bag module 18 is located within the trim cover 30 mounted on a portion 24a of the frame 24, as described below, adjacent but in a spaced relationship from the trim cover release seam 32. The air bag module 18 includes a housing 33 and an inflator 34 and a schematically illustrated folded or rolled stored air bag 36 which, upon deployment, is inflated by the inflator to project outwardly from the seat component through the air bag release seam 32 of the trim cover 30. The air bag module 18 includes at least one threaded stud and nut mounting connection 38 on the portion 24 a of the frame 24.

With continuing reference to FIG. 3, an air bag guide of the seat back component is generally indicated by 44 and includes an inner panel 46 and an outer panel 48 that are each made of a flexible material such as a suitable cloth. The flexible inner panel 46 has an outer extremity 50 adjacent the air bag release seam 32 and also has an inner extremity 52 as is hereinafter more fully described. The flexible outer panel 48 has an outer extremity 54 adjacent the air bag release seam 32 and has an inner extremity 56 which is also hereinafter more fully described.

Figure 4:
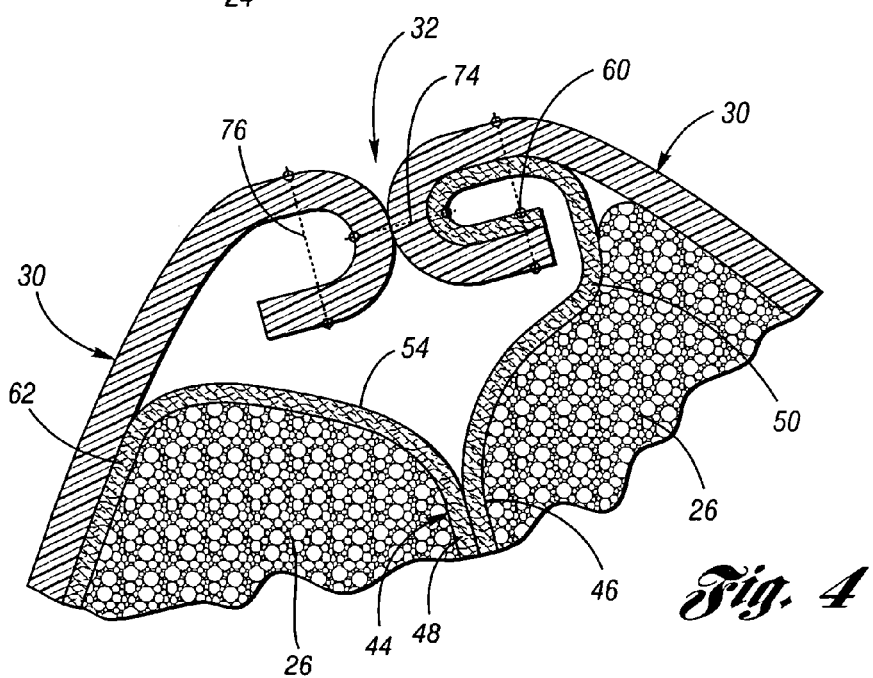
FIG. 4 is an enlarged view of a portion of FIG. 3 illustrating the construction of inner and outer flexible panels of an air bag guide adjacent a release seam of a trim cover of the seat back component.

At the air bag release seam 32 as illustrated in FIGS. 3 and 4, the outer extremity 50 of the flexible inner panel 46 is secured to the trim cover 30 by stitching 60, while the outer extremity 54 of the flexible outer panel 48 is unconnected or free from attachment to the trim cover 30 and has a curved shape extending around the seat pad 26 and thence away from the release seam alongside the trim cover to provide a guide flap 62.

With continuing reference to FIG. 3, the flexible inner and outer panels 46 and 48 extend alongside each other from their outer extremities 50 and 54 to the side air bag module 18 and thence inwardly and outwardly thereof for connection within the seat back component. Upon deployment of the side air bag module 18, the air bag 36 moves through an opening 68' out of the housing 33 and between the flexible inner and outer panels 46 and 48 which then provide a guiding function of the air bag. The inflating air bag 36 thus moves between the flexible inner and outer panels 46 and 48 toward the air bag release seam 32 and eventually tears open the release seam and moves outwardly from the seat to provide occupant protection.

The inner and outer flexible panels 46 and 48 may be made of any suitable flexible material effective to guide the air bag 36 from the module to the release seam. For example, a woven or non-woven cloth material, which may include natural materials or a synthetic material such as nylon. One material that is found to be effective is a polyester material of the type from which the air bag 36 may be manufactured. Regardless of the type of material used to make the air bag guide 44, the use of the air bag guide can be helpful in reducing friction on the air bag 36 as it is deployed. Although a polymer such as nylon may be particularly beneficial, even a fleece material will help reduce the friction on the air bag 36 because the air bag guide 44 prevents contact between the deploying air bag 36 and the seat pad 26.

As the air bag is deployed, the cooperation between the flexible inner panel outer extremity 50 secured to the trim cover 30 by the stitching 60 and the guide flap 62 provided by the outer extremity 54 of the flexible outer panel 48 facilitates the air bag guiding without contacting the seat pad 26.

As shown in FIG. 3, the inner extremities 52 and 56 of the flexible inner and outer panels 46 and 48 are located between the air bag module 18 and the frame 38. Furthermore, the connection 38 includes at least one, and preferably two or three, threaded stud and nut connectors 64 that secure the air bag module and the inner extremities of the flexible inner and outer panels to the frame.

As shown in FIG. 5, the inner extremities 52 and 54 of the flexible inner and outer panels 46 and 48 are secured to each other by stitching 66 that preferably includes two stitched rows 68 extending in a spaced and parallel relationship to each other. Holes 70, three shown, provide for assembly of the threaded stud and nut connectors 64 previously described in connection with FIG. 3. The studs of these connectors thus extend through two layers of the flexible panels to provide reinforcement of the air bag guide after assembly.

As shown in FIGS. 5 and 6, the flexible inner and outer panels 46 and 48 include indicators provided by notches 70 which are aligned upon folding over from the position of FIG. 5 to the position of FIG. 6 during the fabrication. After the folding as shown in FIG. 6, the flexible outer panel 48 extends past the flexible inner panel 46 to provide the guide flap 62. The folded air bag guide 46 is then provided with stitching 72 as shown in FIG. 7 to secure the outer extremity 50 of the inner panel 46 to the outer extremity 54 of the outer panel 48 at a location which, after assembly as shown in FIG. 3, is adjacent the air bag release seam 32.

Figure 8:
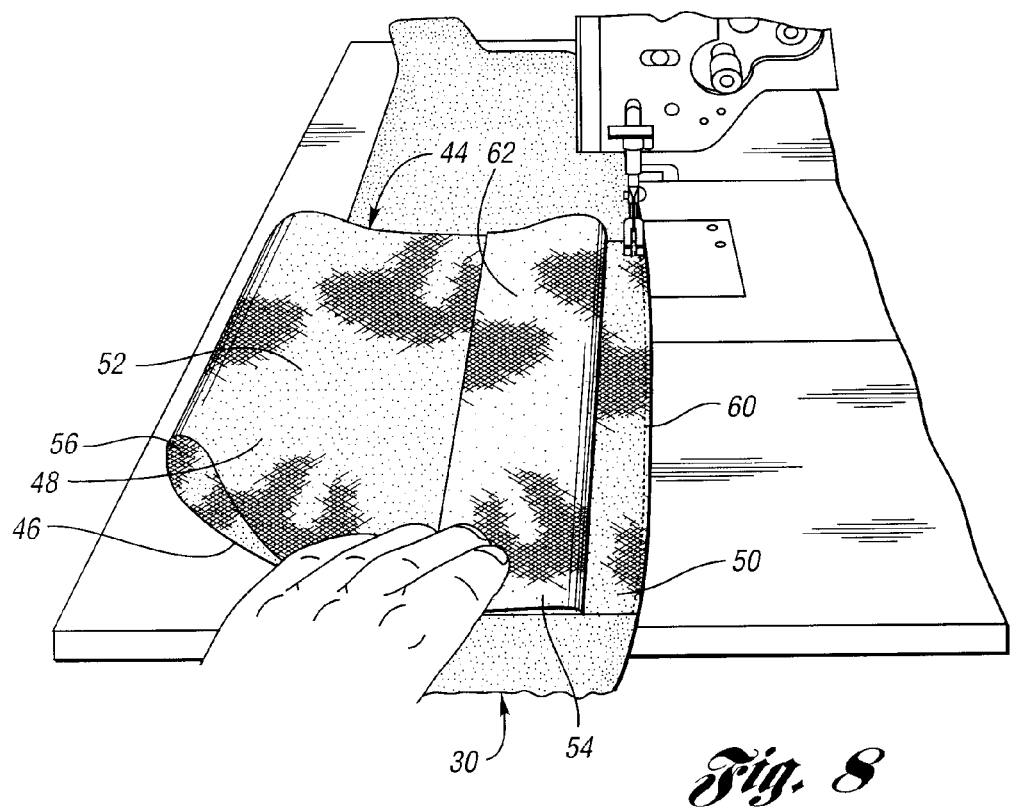
FIG. 8 is a perspective view illustrating the flexible inner panel of the air bag guide being stitched to the trim cover during fabrication.
Figure 9:
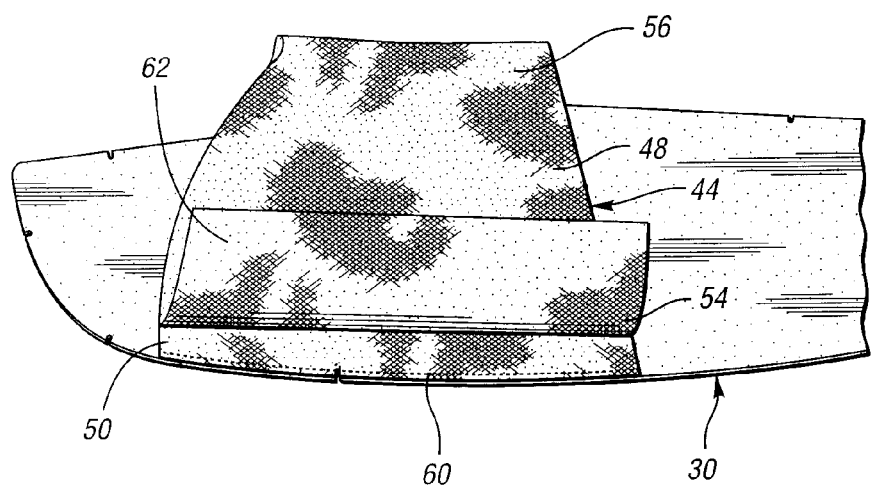
FIG. 9 is a perspective view showing the air bag guide after its stitching to the illustrated portion of the trim cover.

Fabrication of the seat component as shown in FIGS. 8 and 9 also includes the securement of the outer extremity 50 of the flexible inner panel 46 to the trim cover 30 by the stitching 60 previously described in connection with FIG. 4. The flexible inner panel 46 is thus secured to the trim cover 30 while the guide flap 62 of the flexible outer panel 48 is unconnected to the trim cover as previously discussed.

As best shown in FIG. 4, the air bag release seam 32 is secured by stitching 74 which is torn by the inflating air bag as it is guided outwardly between the flexible inner and outer panels 46 and 48 adjacent their outer extremities 50 and 54. Stitching 76 also is provided at the release seam on the opposite side of the stitching 74 from the stitching 60 that secures the outer extremity 50 of the flexible inner panel 46.

While preferred embodiment of the invention has been illustrated and described, it is not intended that this embodiment illustrates and describes all possible forms of the invention. Rather, the words used in the specification are words of description rather than limitation, and it is understood that various changes may be made without departing from the spirit and scope of the invention.

What is claimed is:

1. A vehicle seat component comprising:
a frame for mounting on an associated vehicle on which the vehicle seat component is to be used;
a seat pad mounted by the frame and having a side extremity;
a trim cover extending over the seat pad and having an air bag release seam adjacent the side extremity of the seat pad;
an air bag module mounted on the frame within the trim cover in a spaced relationship from its air bag release seam, and the air bag module including an inflator and an air bag that is inflated by the inflator to project outwardly from the seat component through the air bag release seam of the trim cover;
an air bag guide including an inner panel and an outer panel that are each made of flexible material and have outer and inner extremities with their outer extremities located adjacent the air bag release seam, the flexible inner and outer panels extending alongside each other from their outer extremities to the air bag module and thence respectively inwardly and outwardly thereof, the outer extremity of the flexible inner panel being secured to the trim cover adjacent the release seam, and the outer extremity of the flexible outer panel being free from attachment to the trim cover and having a curved shape extending around the seat pad adjacent the release seam and thence away from the release seam alongside the trim cover to provide a guide flap; and
a connection for securing the inner extremities of the flexible inner and outer panels to the frame.

2. A vehicle seat component as in claim 1 wherein the inner extremities of the flexible inner and outer panels are located between the air bag module and the frame, and at least one connector that embodies the connection for securing the air bag module and the inner extremities of the flexible inner and outer panels to the frame.

3. A vehicle seat component as in claim 2 wherein the inner extremities of the flexible inner and outer panels are secured to each other and located between the air bag module and the frame.

4. A vehicle seat component as in claim 3 which includes stitching that secures the inner extremities of the flexible inner and outer panels to each other.

5. A vehicle seat component as in claim 4 wherein the stitching includes two stitched rows that secure the inner extremities of the flexible inner and outer panels to each other.

6. A vehicle seat component as in claim 5 wherein the flexible inner and outer panels include indicators for positioning thereof juxtaposed with respect to each other during fabrication so the outer extremity of the flexible outer panel extends past the outer extremity of the flexible inner panel to provide the guide flap, and the flexible inner and outer panels being secured to each other adjacent the release seam of the trim cover.

7. A vehicle seat component as in claim 6 wherein stitching secures the flexible inner and outer panels to each other adjacent the release seam of the trim cover, and stitching that secures the outer extremity of the flexible inner panel to the trim cover adjacent the release seam.

8. A vehicle seat component as in claim 7 wherein stitching secures the release seam of the trim cover.

9. A vehicle seat component comprising:
a frame for mounting on an associated vehicle on which the vehicle seat component is to be used;
a seat pad mounted by the frame and having a side extremity;
a trim cover extending over the seat pad and having an air bag release seam adjacent the side extremity of the seat pad;
an air bag module mounted on the frame within the trim cover in a spaced relationship from its air bag release seam, and the air bag module including an inflator and an air bag that is inflated by the inflator to project outwardly from the seat component through the air bag release seam of the trim cover;
an air bag guide including an inner panel and an outer panel that are each made of flexible material and have outer and inner extremities with their outer extremities located adjacent the air bag release seam, the flexible inner and outer panels extending alongside each other from their outer extremities to the air bag module and thence respectively inwardly and outwardly thereof, the outer extremity of the flexible inner panel being secured to the trim cover adjacent the release seam, the outer extremity of the flexible outer panel being free from attachment to the trim cover and having a curved shape extending around the seat pad adjacent the release seam and thence away from the release seam alongside the trim cover to provide a guide flap, and the inner extremities of the flexible inner and outer panels being located between the frame and air bag module and having stitching so as to be secured to each other; and
a connection including at least one connector for securing the air bag module and the inner extremities of the flexible inner and outer panels to the frame.

10. A vehicle seat component comprising:
a frame for mounting on an associated vehicle on which the vehicle seat component is to be used;
a seat pad mounted by the frame and having a side extremity;
a trim cover extending over the seat pad and having an air bag release seam adjacent the side extremity of the seat pad, and stitching that secures the trim cover at the air bag release seam;
an air bag module mounted on the frame within the trim cover in a spaced relationship from its air bag release seam, and the air bag module including an inflator and an air bag that is inflated by the inflator to project outwardly from the seat component through the air bag release seam of the trim cover;
an air bag guide including an inner panel and an outer panel that are each made of flexible material and have outer and inner extremities with their outer extremities located adjacent the air bag release seam, the flexible inner and outer panels extending alongside each other from their outer extremities to the air bag module and thence respectively inwardly and outwardly thereof, the flexible inner and outer panels having stitching to each other adjacent the release seam of the trim cover, the outer extremity of the flexible inner panel having stitching to the trim cover adjacent the release seam, and the outer extremity of the flexible outer panel being free from attachment to the trim cover and having a curved shape extending around the seat pad adjacent the release seam and thence away from the release seam alongside the trim cover to provide a guide flap, and the inner extremities of the flexible inner and outer panels being located between the frame and air bag module and having stitching so as to be secured to each other;

indicators on the flexible inner and outer panels for positioning thereof juxtaposed with respect to each other during fabrication so the outer extremity of the flexible outer panel extends past the outer extremity of the flexible inner panel to provide the guide flap; and a connection including at least one connector for securing the air bag module and the inner extremities of the flexible inner and outer panels to the frame.

* * * * *